(No Model.)

W. T. COTTIER.
FRUIT BOX OR CRATE.

No. 512,809. Patented Jan. 16, 1894.

Witnesses:
C. H. Raider
K. F. Matthews.

Inventor
William Talbot Cottier
By James J. Sheehy
Attorney

UNITED STATES PATENT OFFICE.

WILLIAM TALBOT COTTIER, OF LOS ANGELES, CALIFORNIA.

FRUIT BOX OR CRATE.

SPECIFICATION forming part of Letters Patent No. 512,809, dated January 16, 1894.

Application filed March 6, 1893. Serial No. 464,825. (No model.)

*To all whom it may concern:*

Be it known that I, WILLIAM TALBOT COTTIER, a citizen of the United States, residing at Los Angeles, in the county of Los Angeles and State of California, have invented certain new and useful Improvements in Fruit Boxes or Crates; and I do declare the following to be a full, clear, and exact description of the invention, such as will enable others skilled in the art to which it appertains to make and use the same.

My invention relates to improvements in fruit boxes or crates, and it has for its general object to provide a ventilated box or crate embodying such a construction that all vapors, gases, and odors resulting from exudations, will be carried off as soon as generated, and the fruit will be kept in a cool, dry and wholesome condition.

Other objects and advantages of the invention will be fully understood from the following description and claims when taken in connection with the accompanying drawings, in which—

Figure 1:
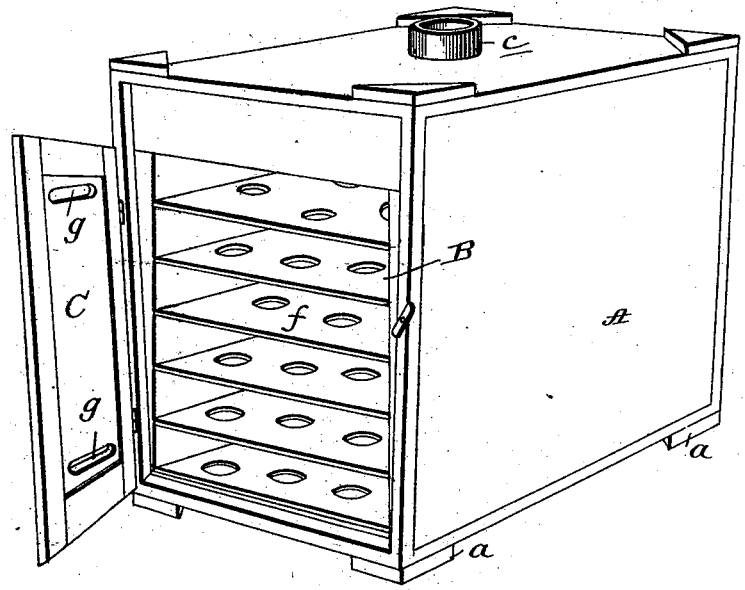
Figure 2:
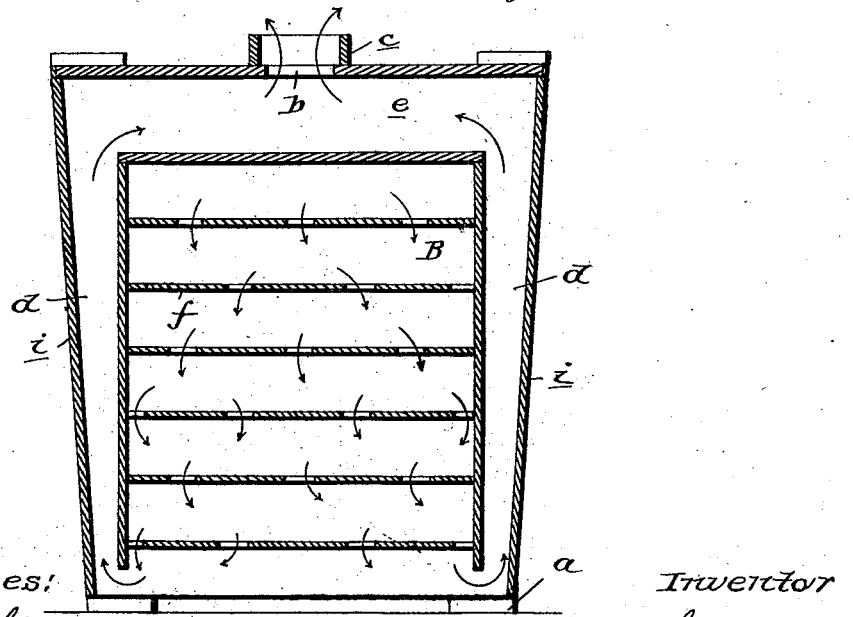

Figure 1, is a perspective view of my improved box or crate with the door open, and Fig. 2, is a vertical, transverse section of the same.

Referring by letter to said drawings:—A, indicates the outer casing of my improved box or crate, which is preferably of a general rectangular form, as illustrated. This outer casing is provided upon its lower side, preferably at its corners with pillow blocks $a$, which serve to support the box so that air may take into the lower portion of the same; and the said casing is also provided in its upper side with an egress aperture $b$, for the escape of the air; which aperture is preferably surrounded by an annulus or collar $c$, as illustrated.

By mounting the casing A, upon the blocks $a$, and providing the aperture $b$, in the top wall of said casing, it will be seen that a continuous current of air will flow through the casing, past the sides of the interior chamber B, and said chamber will thereby be kept cool and dry.

The interior chamber B, which is designed to receive fruit, vegetables or other perishable products, is preferably of a rectangular shape and of the proportional size shown; and said chamber is so arranged within the casing A, that the air passages or flues $d$, and the expansion chamber $e$, will be formed between the same and the casing.

As better shown in Fig. 2, of the drawings, the chamber B, is provided with a series of foraminated or open-work shelves $f$, which are designed to support the products to be transported; and the said chamber has the lower ends of its side walls arranged in a plane above that of the lower ends of the casing walls, whereby it will be seen that the current of air entering beneath the casing walls will create a suction at the lower end of the chamber and will exhaust the air therefrom.

C, indicates the door of the interior chamber B. This door C, is connected to the casing A, by hinges or the like; and it is provided, preferably adjacent to its upper and lower ends with openings or slots $g$, for the admission of fresh air into the chamber.

By the construction thus far described it will be seen that the air which enters the chamber B, through the door C, will pass down through the chamber, thence up the flues or passages $d$, into the expansion chamber $e$, and finally out through the egress aperture $e'$. Thus a continuous current of air is maintained through the chamber B, and upon the outside of the same, and not only is the gas or vapor generated in the chamber, carried off but the chamber and the fruit contained therein are kept in a cool, dry and wholesome condition, which is an important desideratum.

In order to increase the draft of air through the box or crate, I prefer to taper the flues $d$, as shown in Fig. 2, as by employing tapering flues, the air is allowed to expand and its ascent is consequently accelerated. This tapering of the flues $d$, may be effected by canting or inclining the side walls $i$, of the casing A, which is the preferred construction, or by canting or inclining the side walls of the chamber B, or by inclining the side walls of both casing and chamber as is most desirable.

It will be noted from the foregoing description that my improved box or crate is so thoroughly ventilated, and the receiving chamber, and fruit, vegetables or meat contained therein, are kept so dry and cool that the use of ice, which would otherwise be necessary, is obviated. This is an important advantage since not only the cost of ice is saved, but the necessity of reserving space in the box or crate for the reception of ice is avoided. It will also be noted from the foregoing description taken in connection with the drawings, that while my invention is more especially designed for boxes or crates for transporting fruit, yet it may be applied with equal success to stationary meat, fruit and vegetable safes or receptacles.

Having described my invention, what I claim is—

1. A shipping box or crate comprising an outer casing having an open bottom, and an egress aperture in its top, a receiving chamber B, arranged within the outer casing, and having the lower ends of its walls resting in a plane above the lower ends of the casing, and also having the induction apertures and having the expansion chamber e, above the receiving chamber, and the flues or passages d, connecting the interior of the receiving chamber, with the expansion chamber, substantially as specified.

2. A box or crate for transporting perishable produce, comprising an outer casing mounted on pillow blocks and having an egress aperture, a receiving chamber B, arranged within the outer casing and having the lower ends of its walls resting in a plane above the lower ends of the casing, the expansion chamber e, above the chamber B, the flues or passages d, connecting the interior of the chamber B, and the expansion chamber, and the door having an induction aperture opening into the chamber B, substantially as specified.

3. A box or crate for transporting perishable fruit comprising the following instrumentalities in combination, viz:—an outer casing mounted on pillow blocks and having an egress aperture, a receiving chamber B, arranged within the outer casing and having the lower ends of its walls resting in a plane above the lower ends of the casing walls, a series of shelves arranged in the chamber B, and adapted to support the produce to be transported, the expansion chamber e, above the chamber B, tapering flues or passages connecting the interior of the chamber B, and the expansion chamber, and the door having an induction aperture opening into the chamber B, substantially as specified.

In testimony whereof I affix my signature in presence of two witnesses.

WILLIAM TALBOT COTTIER.

Witnesses:
    LEE D. CRAIG,
    M. W. WESTON.